United States Patent
Tanabe et al.

(10) Patent No.: US 7,952,802 B2
(45) Date of Patent: May 31, 2011

(54) OPTICAL DEVICE PROVIDED WITH POLARIZING PLATE

(75) Inventors: Hirofumi Tanabe, Tsukuba (JP); Tatsufumi Watanabe, Tsukuba (JP); Katsuya Fujisawa, Tsukuba (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 12/615,067

(22) Filed: Nov. 9, 2009

(65) Prior Publication Data

US 2010/0051192 A1 Mar. 4, 2010

Related U.S. Application Data

(62) Division of application No. 10/592,146, filed as application No. PCT/JP2005/003720 on Mar. 4, 2005, now abandoned.

(30) Foreign Application Priority Data

Mar. 9, 2004 (JP) .................................. 2004-065671

(51) Int. Cl.
 *G02B 5/30* (2006.01)
(52) U.S. Cl. .................................. 359/483.01; 359/507
(58) Field of Classification Search .................. None
 See application file for complete search history.

(56) References Cited

U.S. PATENT DOCUMENTS

| | | | |
|---|---|---|---|
| 6,413,641 B1 | 7/2002 | Yamasaki et al. | |
| 6,893,146 B2 | 5/2005 | Fiegler et al. | |
| 6,950,235 B2 | 9/2005 | Sabia et al. | |
| 7,209,196 B2 | 4/2007 | Saiki et al. | |
| 2002/0145801 A1 | 10/2002 | Tsuchimoto et al. | |
| 2002/0186461 A1 | 12/2002 | Saiki et al. | |
| 2003/0151707 A1 | 8/2003 | Kobayashi et al. | |
| 2003/0174507 A1* | 9/2003 | Fiegler et al. | 362/487 |
| 2003/0189754 A1 | 10/2003 | Sugino et al. | |
| 2003/0206347 A1* | 11/2003 | Sabia et al. | 359/484 |

FOREIGN PATENT DOCUMENTS

| | | |
|---|---|---|
| CN | 1380576 A | 11/2002 |
| CN | 1388402 A | 1/2003 |
| JP | 7 56017 | 3/1995 |
| JP | 2000 266932 | 9/2000 |

(Continued)

OTHER PUBLICATIONS

Notification of Reason(s) for Rejection, Issued Dec. 28, 2010 in Japanese Application No. 2006-519391.

(Continued)

*Primary Examiner* — Stephone B Allen
*Assistant Examiner* — Derek S Chapel
(74) *Attorney, Agent, or Firm* — Oblon, Spivak, McClelland, Maier & Neustadt, L.L.P.

(57) ABSTRACT

Disclosed is an optical device which can be formed as a thinner layer by a simplified manufacturing process at a reduced cost. Specifically, the optical device has a multilayer structure wherein a polyvinyl alcohol- or polyvinylene-base polarizing film (b) and protective films (a and c) are directly laminated on top of another without any adhesive layer including a pressure sensitive adhesive layer interposed therebetween. The protective film (c) on one side is composed of a triacetyl cellulose, an alicyclic polyolefin resin, or an alicyclic acrylic resin, and the protective film (a) on the other side is composed of a triacetyl cellulose, a polycarbonate, a polyethylene terephthalate, a polyethylene naphthalate, a (meth) acrylate resin, an alicyclic polyolefin resin, or an alicyclic acrylic resin.

11 Claims, 2 Drawing Sheets

FOREIGN PATENT DOCUMENTS

| | | |
|---|---|---|
| JP | 2000 356714 | 12/2000 |
| JP | 2002 303725 | 10/2002 |
| JP | 2002 303727 | 10/2002 |
| JP | 2002 365429 | 12/2002 |

OTHER PUBLICATIONS

Communication Pursuant to Article 94(3) EPC, in European Patent Application No. 05 719 992.9-2217, Issued Mar. 23, 2011.

* cited by examiner

OPTICAL DEVICE PROVIDED WITH POLARIZING PLATE

The present application is a divisional of U.S. patent application Ser. No. 10/592,146, filed on Sep. 8, 2006 and having a 35 U.S.C. 371(c) date of Jan. 22, 2007, now abandoned which is a 35 U.S.C. §371 National Stage patent application of International patent application PCT/JP2005/003720, filed on Mar. 4, 2005, which claims priority to Japanese patent application JP 2004-065671, filed on Mar. 9, 2004, the contents of which are hereby incorporated by reference in their entirety.

FIELD OF THE INVENTION

This invention relates to an optical device having a laminate layer of a polyvinyl alcohol- or polyvinylene-base polarizing film and a protective film.

BACKGROUND ART

A polarizing plate, which is one component of the optical device, has a structure in which transparent protective films are laminated to both sides of a polyvinyl alcohol base polarizing film in which iodine or a dye is adsorbed and oriented or a polyvinylene base polarizing film obtained by the dehydration of polyvinyl alcohol. An adhesive has been used in laminating these layers together. Various adhesives have been known for this purpose, examples of which include epoxy, acrylic, and urethane-base types, but there is a drawback in these adhesives generally not to have enough adhesion to stick to a polarizing film. Vinyl acetate adhesives and polyvinyl alcohol adhesives have relatively good adhesion to a polarizing film, but these adhesives have a problem that the adhesive strength is affected by humidity.

In view of this, surface treatments have been performed on a protective film to improve the adhesion between an adhesive agent and a protective film or polarizing film. In a case of using a triacetyl cellulose film, which is commonly employed as a protective film, a method has been utilized in which the triacetyl cellulose film is immersed in a high-temperature and high-concentration alkali solution to be saponified, which renders the surface hydrophilic, and the surface is then coated with an adhesive and stuck together with a polarizing film. Another method has been proposed in which the surface of a cellulose ester film, polycarbonate film, polyester film, or polyacrylic film is treated with a plasma, after which it is stuck together with a polarizing film with an adhesive layer interposed therebetween (Japanese Laid-Open Patent Application 2000-356714).

Also, in recent years liquid crystal display devices have sometimes become to be used under conditions of high temperature and humidity in outdoor or automotive applications, and this creates a need for a polarizing plate with high resistance to heat and moisture and with a high degree of polarization and high transmission for high-resolution color display. To meet this need, there has been proposed a method to use a triacetyl cellulose film as a protective film on one side, and a polycarbonate resin film and/or a polymethyl methacrylate resin film as the other side protective film (Japanese Laid-Open Patent Application H7-56017).

However, there is a problem in both of the above methods that an adhesive layer is interposed in the lamination of the polarizing film and the protective films, making it difficult to reduce a film thickness, to reduce costs and to simplify the production process.

Further, issues with the viewing angle, coloring, and so forth are encountered with liquid crystal display devices obtained by bonding the above-mentioned polarizing plate to a liquid crystal cell. These are due to the birefringence of the liquid crystal molecules in the liquid crystal cell. Therefore, the birefringence of the liquid crystal molecules can be compensated for by disposing a retardation plate having a birefringence between the polarizing plate and the liquid crystal cell, and this can solve the above problems. Nevertheless, an adhesive layer is generally interposed in a lamination of the polarizing plate and the retardation plate, and this prevents further reduction of the laminate film thickness in a liquid crystal display device.

DISCLOSURE OF THE INVENTION

As a result of diligent research aimed at solving the above problems, the inventors arrived at the present invention upon discovering that a polarizing film and a protective film can be directly laminated without having to use any adhesive including a pressure-sensitive adhesive. Specifically, it is an object of the present invention to provide an optical device with which film thickness and cost can be reduced and the production process can be simplified, by directly laminating a polarizing film and a protective film and, if necessary, a retardation plate, without any adhesive including a pressure-sensitive adhesive being interposed therebetween.

To achieve the stated object, the optical device pertaining to the present invention has a protective film directly laminated, without any adhesive layer including a pressure-sensitive adhesive layer being interposed, to at least one side of a polyvinyl alcohol- or polyvinylene-base polarizing film. In another embodiment, the optical device further comprises a retardation plate, in which one of the protective films and the retardation plate are directly laminated, without any adhesive layer including a pressure-sensitive adhesive layer being interposed. Also, a retardation plate may be used as one of the protective films in the optical device.

Further, it is preferred in the optical device pertaining to the present invention that at least one of the surfaces of the polarizing film, protective film, and retardation plate has been treated with energy rays having an energy of at least 5 eV.

When the protective films are laminated on both sides of the polarizing film, the protective film on one side is a film composed of triacetyl cellulose, alicyclic polyolefin resin, or alicyclic acrylic resin, and the protective film on the other side is a film composed of triacetyl cellulose, polycarbonate, polyethylene terephthalate, polyethylene naphthalate, (meth) acrylate resin, alicyclic polyolefin resin, or alicyclic acrylic resin. If the protective film is laminated to only one side of the polarizing film, it is a film composed of triacetyl cellulose, polycarbonate, polyethylene terephthalate, polyethylene naphthalate, (meth)acrylate resin, alicyclic polyolefin resin, or alicyclic acrylic resin.

With this optical device, because a polarizing film and a protective film, and/or a protective film and a retardation plate, and/or a polarizing film and a retardation plate, are directly laminated, film thickness and cost can be reduced and the production process can be simplified.

With the optical device of the present invention, because a polarizing film and a protective film, and/or a protective film and a retardation plate, and/or a polarizing film and a retardation plate, are directly laminated without the use of any adhesive including a pressure-sensitive adhesive, film thickness and cost can be reduced and the production process can be simplified. Also, with the present invention, because it is possible to laminate a polarizing film, a protective film, and a retardation plate that have no adhesiveness, without using any adhesive including a pressure-sensitive adhesive, various transparent films having no adhesiveness or pressure-sensitive adhesiveness can be used as a protective film and a retardation plate.

BRIEF DESCRIPTION OF THE DRAWINGS

This invention will be understood more clearly from the following description of preferred examples given through reference to the appended drawings. However, the examples and drawings are merely given for the sake of illustration and explanation, and should not be construed to determine the scope of the present invention. The scope of the present invention is determined by the appended claims. In the appended drawings, the same numbers in different drawings represent the same components.

DETAILED DESCRIPTION OF THE EMBODIMENTS

The present invention will now be described in detail through reference to the drawings.

Figure 1:
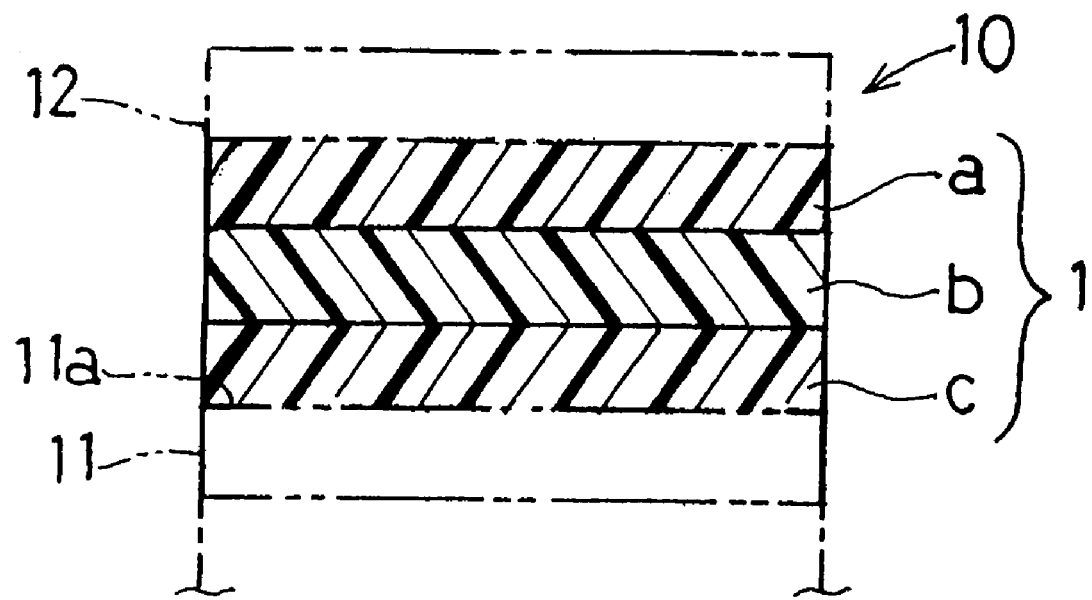
FIG. 1 is a vertical cross sectional view of a polarizing film pertaining to a first embodiment of the present invention, in which protective films are laminated on both sides of the polarizing film.
Figure 2:
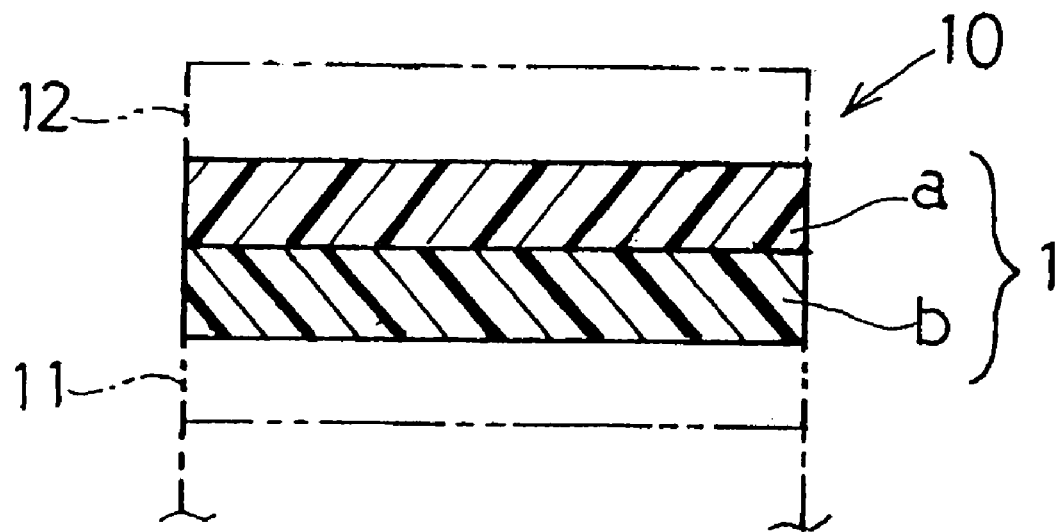
FIG. 2 is a vertical cross sectional view of a polarizing film pertaining to a second embodiment of the present invention, in which a protective film is laminated on only one side of the polarizing film.
Figure 3:
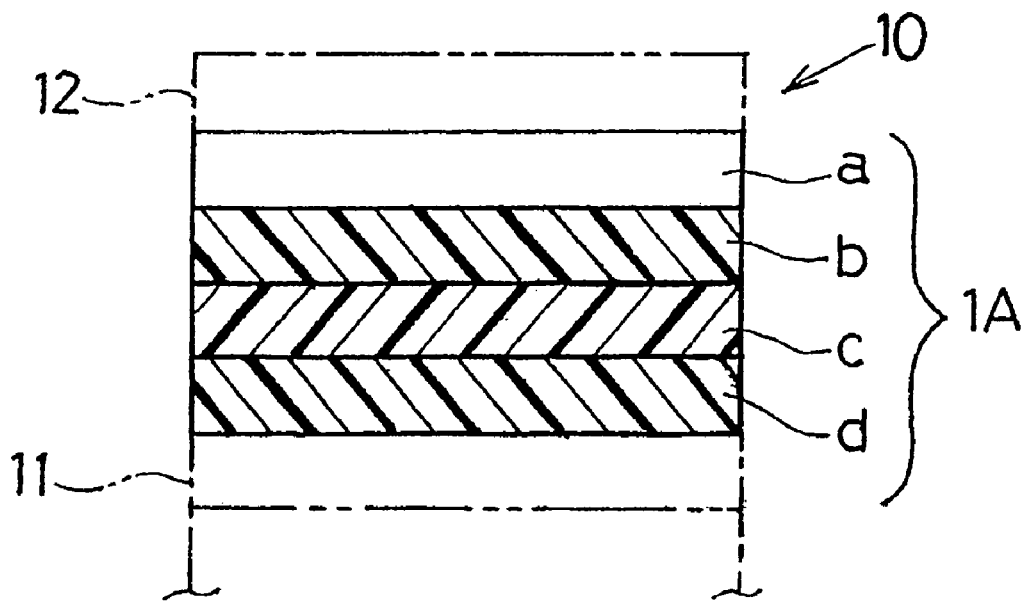
FIG. 3 is a vertical cross sectional view of a polarizing film pertaining to a third embodiment of the present invention, which is equipped with a retardation plate.
Figure 4:
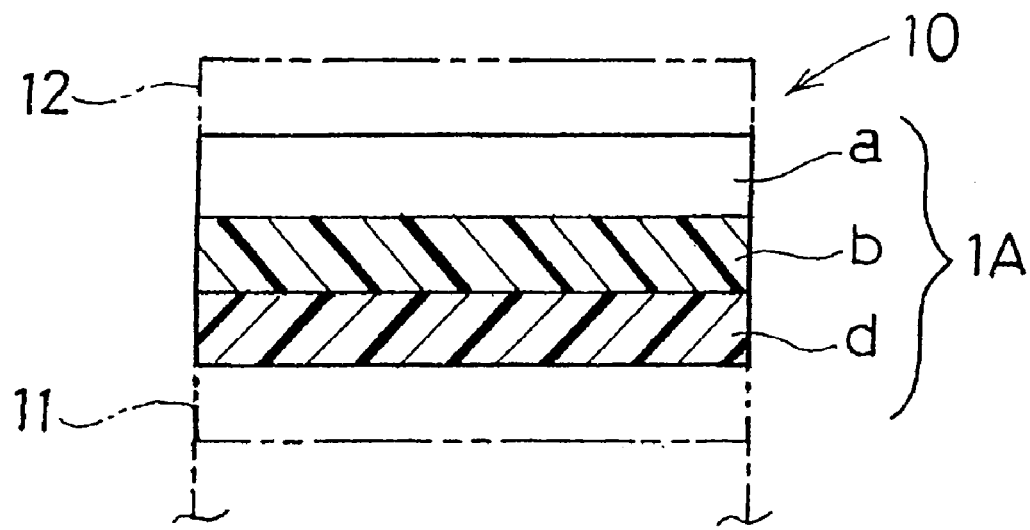
FIG. 4 is a vertical cross sectional view of a polarizing film pertaining to a fourth embodiment of the present invention, which is equipped with a retardation plate.

FIG. 1 is a vertical cross sectional view of a polarizing plate pertaining to a first embodiment of the present invention, FIG. 2 is a vertical cross sectional view of a polarizing plate pertaining to a second embodiment of the present invention, FIG. 3 is a vertical cross sectional view of a polarizing plate pertaining to a third embodiment of the present invention, which is equipped with a retardation plate, and FIG. 4 is a vertical cross sectional view of a polarizing plate pertaining to a fourth embodiment of the present invention, which is equipped with a retardation plate. The polarizing plate that is the optical device 1 shown in FIG. 1 is mounted between a liquid crystal cell 11 and a glass substrate 12 of a liquid crystal display device 10, and protective films a and c are laminated directly to both sides of a polarizing film b, without any adhesive layer or pressure-sensitive adhesive layer being interposed therebetween. The protective film a is disposed on the opposite side from a liquid crystal cell face 11a when mounted in the liquid crystal cell 11, and the protective film c is disposed on the glass surface side of the liquid crystal cell 11, that is, on the liquid crystal cell surface side 11a. The protective film a is laminated directly to only one side of the polarizing film b, without any adhesive including a pressure-sensitive adhesive interposed therebetween in the polarizing film in FIG. 2

Polyvinyl alcohol or polyvinylene base films are used as the polarizing film b that constitutes the polarizing plate 1. A polymer produced by saponifying a polyvinyl ester polymer obtained by polymerizing a vinyl ester monomer can be used as the polyvinyl alcohol polymer that forms the polyvinyl alcohol-base polarizing film, and vinyl acetate is preferably used as the vinyl ester monomer here. In the polymerization of the vinyl ester monomer, a copolymerizable monomer can be copolymerized with said vinyl ester monomer as needed, to the extent that the effect of the present invention is not compromised.

The polyvinylene polymer that constitutes the polyvinylene polarizing film b can be one in which a polyene structure is formed by dehydrating said polyvinyl alcohol polymer, or by removing the hydrogen halide from a halogen-containing vinyl polymer such as polyvinyl chloride, or it can be one in which a polyene structure is formed by polymerizing a vinylene monomer such as acetylene, for example.

Examples of the protective films a and c that constitute the polarizing plate 1 include films composed of triacetyl cellulose and other such cellulose esters or derivatives thereof; polyethylene terephthalate, polyethylene naphthalate, and other such polyester films; polycarbonate films; polyethylene, polypropylene, and other such polyolefin films or polycycloolefin, norbornene resin, and other such alicyclic polyolefin films; films composed of polymethyl methacrylate, acrylic resins, or alicyclic acrylic resins; and ethylene vinyl alcohol films. The use of triacetyl cellulose is preferable. A film in which two or more of the above resins are laminated or mixed can also be used.

However, the protective film c disposed on one side of the polarizing film b, that is, on the liquid crystal cell side, must be one with little birefringence effect, and to this end, films composed of triacetyl cellulose and other such cellulose esters or derivatives thereof, or polycycloolefins, norbornene resins, and other such alicyclic polyolefin films, or films composed of alicyclic acrylic resins are used, for example.

The protective film a disposed on the other side of the polarizing film b, that is, the opposite side from the liquid crystal cell, may be one that is transparent, and in addition to the above-mentioned films composed of triacetyl cellulose and other such cellulose esters or derivatives thereof, or polycycloolefins, norbornene resins, and other such alicyclic polyolefin films, or films composed of alicyclic acrylic resins, other films that can be used favorably include polyethylene terephthalate, polyethylene naphthalate, and other such polyester films; polyethylene, polypropylene, and other such polyolefin films; polycarbonate films; and films composed of polymethyl methacrylate, (meth)acrylate resins, and other such acrylic resins. Even if this protective film a has birefringence, it will pose no problem since it is disposed on the opposite side from the liquid crystal cell, nor will uniformity of birefringence be a problem. The result of thus laminating a film with low water absorption on the opposite side from the liquid crystal cell is that almost no moisture infiltrates from the glass surface side of the liquid crystal cell, and because the moisture permeability from the outside is also low, the resulting polarizing plate has excellent resistance to wet heat.

Examples of the retardation plate d include a retardation plate formed from a single crystal of mica, quartz, rock crystal, calcite, $LiNbO_3$, $LiTaO_3$, or another such material with birefringence; a retardation plate having a birefringent film on the surface of an underlying substrate, obtained by vapor depositing an inorganic material at an angle to a glass substrate or other such underlying substrate; a retardation plate having an LB (Langmuir-Blodget) film with birefringence; and a retardation plate formed by sandwiching between two glass substrates or by bonding to a glass substrate, in order to keep the film flat and in a constant shape, a retardation film obtained by drawing a transparent resin film made of triacetyl cellulose (TAC) or another such cellulose ester, polycarbonate, polyvinyl alcohol (PVA), polyvinyl butyral (PVB), polyethylene terephthalate (PET), polypropylene (PP), polyallylate, polysulfone, polyether sulfone, acrylic resin, norbornene resin or other such alicyclic polyolefin, or the like.

When a polarizing film with excellent resistance to wet heat is used, such as a polyvinylene base polarizing film or a polyvinyl alcohol base polarizing film containing a dichroic dye, it is possible to laminate the protective film a to only the opposite side, without laminating the protective film c to the liquid crystal cell side 11, as shown in the second embodiment in FIG. 2. Also, an optical device 1A with excellent wet heat resistance can be obtained either by directly laminating the retardation plate d to the surface of the protective film c on the liquid crystal cell side, without any adhesive layer including a pressure-sensitive adhesive layer interposed, as shown in FIG. 3, or by directly laminating the retardation plate d as a protective film to the face of the polarizing film b on the liquid crystal cell side without any adhesive layer or pressure-sensitive adhesive layer interposed and laminating the protective film a to only the other side, as shown in FIG. 4.

Also, it is preferable if the surface of the protective film a on the observer's side, which is disposed on the outside of the polarizing film, is subjected to an antiglare treatment and/or an antireflective treatment. This makes it easier for a user to view the liquid crystal cell.

It is preferred that the lamination is performed after the surfaces of the polarizing film, protective films, and retardation plate that are in contact with each other have been treated by being irradiated with energy rays having an energy of at least 5 eV, to prepare the optical devices 1 and 1A pertaining to the present invention. Examples of energy rays having an energy of at least 5 eV include ultraviolet rays, electron beams, and ion beams, of which the use of ultraviolet rays is preferable because of its simplicity.

Examples of ultraviolet ray sources include an excimer laser, a high-pressure mercury lamp, a low-pressure mercury lamp, a halogen lamp, and an excimer lamp. Examples of the excimer lamp here include a dielectric barrier discharge lamp charged with argon, krypton, or xenon, or with a gas whose main component is argon, krypton, or xenon. Of these, the use of xenon is preferred.

Preferably, the polarizing film surface and/or the protective film surface and/or the retardation plate surface during energy ray irradiation is in contact with a gas, in which case it is preferably brought into contact with at least one gas selected from among air, hydrogen, oxygen, nitrogen, ozone, hydrogen peroxide, water vapor, carbon dioxide, carbon monoxide, ammonia, nitrogen monoxide, nitrogen dioxide, inert gases such as argon, and low-boiling organic compounds such as ketones, alcohols, and hydrazine, or a mixture of these gases. It is preferable for the gas to be air because the operation will be simpler and the work easier.

There are no particular restrictions on how long it takes from the time point of irradiating the polarizing film and/or the protective film and/or the retardation plate with the energy rays until the time point of lamination, but the lamination is preferably performed immediately after energy ray irradiation. It was also discovered that the effect of the energy ray irradiation will in some cases be diminished over time, but is improved by rinsing with water. Therefore, lamination may be performed after immersion in cold or hot water following energy ray irradiation.

Irradiation with energy rays having an energy of at least 5 eV readily breaks molecular bonds such as C—C and C—H and modifies the surface of resins, and this makes possible more secure, direct lamination without the use of an adhesive or pressure-sensitive adhesive. If the energy of the energy rays is less than 5 eV, adhesive strength will not be high enough.

The result of carrying out the above-mentioned surface treatment in at least one gas selected from among air, hydrogen, oxygen, nitrogen, ozone, hydrogen peroxide, water vapor, carbon dioxide, carbon monoxide, ammonia, nitrogen monoxide, nitrogen dioxide, inert gases such as argon, and low-boiling organic compounds such as ketones, alcohols, and hydrazine, or a mixture of these gases, is that the molecular bonds broken by the carbon component, oxygen component, nitrogen component, water, or the like in the atmosphere are surface modified to produce highly hydrophilic functional groups such as hydroxyl groups, amino groups, ketone groups, aldehyde groups, or carboxyl groups.

If the energy ray irradiation time is optimized, the breaking of C—C bonds, C—H bonds, or the like proceeds, forming an oligomer or low-molecular weight compound on the surface, and the surface has the adherent property.

There are no particular restrictions on the temperature during energy ray irradiation, but when the heat resistance of the film is taken into account, about 0 to 100 degrees centigrade is preferable, with room temperature being particularly favorable because it is simplest.

There are no particular restrictions on the pressure during the energy ray irradiation, either, but normal pressure is preferable in terms of making the work easier.

As discussed above, the adherend surface of the polarizing film and/or the protective film and/or the retardation plate is irradiated with energy rays of at least 5 eV, after which two components of the films and plate are laminated together and then two surfaces are securely bonded and fixed, and therefore there is no need for an intermediate layer composed of an adhesive or pressure-sensitive adhesive to be interposed between the adherends, which means that direct lamination is possible. This allows film thickness and cost to be reduced and the production process to be simplified, and furthermore, this gives a polarizing plate in which the decrease in light ray transmission does not occur as caused by the existence of an intermediate layer.

EXAMPLES

Example 1

In this example, a xenon lamp made by Ushio U-Tech Inc. (UER200/HM172; energy of 7.3 eV) was used, and the polarizing film b in FIG. 1 was produced by adsorbing iodine to a polyvinyl alcohol film made by Kuraray Co. Ltd. and then drawing the film. A triacetyl cellulose (TAC) film made by Fuji Photo Film Co. Ltd. was used for the protective films a and c on both sides of the polarizing film. First, the distance between the xenon lamp and the triacetyl cellulose film was accurately adjusted to 2 mm, and irradiation with ultraviolet rays was performed in air for 30 seconds. Then, to check the effect of surface modification, the contact angle between water and the polarizing film was measured with a contact angle meter made by Kyowa Interface Science Co. Ltd. (model CA-DT•A), and found to be 10° (at a temperature of 25° C. and a relative humidity of 50%). Next, the polarizing film and the protective films were laminated under a lamination pressure of 2.94 N/cm$^2$, which gave the polarizing plate 1 (optical device). The adhesive strength between the polarizing film and the protective films in this polarizing plate was measured by 90-degree peel test, which revealed that the adhesive strength at a film width of 50 mm was 0.49N.

Example 2

Protective films were surface modified under the same conditions as in Example 1, and the polarizing film was also similarly subjected to the surface modification treatment. Next, the polarizing film and the protective films were laminated under a lamination pressure of 2.94 N/cm$^2$, which gave a polarizing plate. The adhesive strength between the polarizing film and the protective films in this polarizing film was measured by 90-degree peel test, which revealed that the adhesive strength at a film width of 50 mm was 0.98N.

Example 3

A polarizing film and protective films were surface modified under the same conditions as in Example 1. Next, the protective films were immersed in water, after which the polarizing film and the protective films were laminated under a lamination pressure of 2.94 N/cm$^2$, which gave a polarizing plate. The adhesive strength between the polarizing film and the protective films in this polarizing plate was measured by 90-degree peel test, which revealed that the adhesive strength at a film width of 50 mm was 1.47N.

Example 4

Using a low-pressure mercury vapor lamp made by ORC Manufacturing Co., Ltd. (HMW-615N; energy of 5.0 eV) as the energy ray source, surface modification was performed by the following method. First, the distance between the low-pressure mercury vapor lamp and a protective film composed of triacetyl cellulose was accurately adjusted to 10 mm, and irradiation with ultraviolet rays was performed in air for 200 seconds. To check the effect of surface modification, the contact angle between water and the protective film was measured with a contact angle meter made by Kyowa Interface Science Co., Ltd. (model CA-DT•A), and found to be 20° (at a temperature of 25° C. and a relative humidity of 50%). Next, the polarizing film b and the surface modified protective film a on one side thereof as shown in FIG. 2 were laminated under a lamination pressure of 2.94 N/cm$^2$, which gave a polarizing plate. The adhesive strength between the polarizing film and the protective film in this polarizing plate was measured by 90-degree peel test, which revealed that the adhesive strength at a film width of 50 mm was 0.20 N.

Example 5

A polyvinylene-base polarizing film obtained by dehydration of a polyvinyl alcohol made by Kuraray Co. Ltd. was used as the polarizing film. A triacetyl cellulose (TAC) film made by Fuji Photo Film Co., Ltd. was used as the protective films. The polarizing film and the protective films to be laminated to both sides of the polarizing film were surface modified in the same manner as in Example 2, and then the polarizing film and the protective films were laminated to obtain a polarizing plate.

Example 6

The polarizing film was produced by adsorbing a dichroic dye to a polyvinyl alcohol film made by Kuraray Co. Ltd. and then drawing this product. A triacetyl cellulose film made by Fuji Photo Film Co., Ltd. was used for the protective film c on the liquid crystal cell side, and a polyethylene terephthalate film made by Toyobo Co., Ltd. that had been subjected to an antireflective treatment was used for the protective film a on the observer's side. The polarizing film and the protective films to be laminated to both sides of the polarizing film were surface modified in the same manner as in Example 2, and then the polarizing film and the protective films were laminated to obtain a polarizing plate.

Example 7

The polarizing film was produced by adsorbing iodine to a polyvinyl alcohol film made by Kuraray Co. Ltd. and then drawing this product. A triacetyl cellulose film made by Fuji Photo Film Co., Ltd. was used for the protective film c on the liquid crystal cell side, and a polycarbonate film made by Mitsubishi Engineering-Plastics Corporation was used for the protective film a on the observer's side. The polarizing film and the protective films to be laminated to both sides of the polarizing film were surface modified in the same manner as in Example 2, and then the polarizing film and the protective films were laminated to obtain a polarizing plate.

Example 8

A triacetyl cellulose film (TAC film) made by Fuji Photo Film Co., Ltd. and a Zeonor film (a cycloolefin polymer) made by Zeon Corporation, to be used as protective films, were irradiated with ultraviolet rays under the same conditions as in Example 1. Next, the TAC film and the Zeonor film were laminated to both sides of a polarizing film under a lamination pressure of 2.94 N/cm$^2$, and the adhesive strength thereof was measured by 90-degree peel test, which revealed that the adhesive strength at a film width of 50 mm was 0.50 N.

Example 9

A Zeonor film (a cycloolefin polymer) made by Zeon Corporation was used as the retardation plate d in FIG. 3, the distance between a xenon lamp made by Ushio U-Tech Inc. and the Zeonor film was accurately adjusted to 2 mm, and irradiation with ultraviolet rays was performed in air for 30 seconds. Then, the TAC (protective film) of the polarizing plate obtained in Example 5 was also surface modified in the same manner as in Example 1, and was laminated with the Zeonor film d to obtain an optical device 1A (polarizing plate with the retardation plate).

Example 10

A polarizing film produced by adsorbing a dichroic dye to a polyvinyl alcohol film made by Kuraray Co. Ltd. and then drawing this product, and a Zeonor film made by Zeon Corporation were irradiated with ultraviolet rays under the same conditions as in Example 1. Next, the polarizing film and the Zeonor film were laminated under a lamination pressure of 2.94 N/cm$^2$, and the adhesive strength thereof was measured by 90-degree peel test, which revealed that the adhesive strength at a film width of 50 mm was 0.20 N.

Example 11

A Zeonor film (a cycloolefin polymer film) made by Zeon Corporation was used as the retardation plate d in FIG. 4 the distance between a xenon lamp made by Ushio U-Tech Inc. and the Zeonor film was accurately adjusted to 2 mm, and irradiation with ultraviolet rays was performed in air for 30 seconds. Then, the TAC (protective film) of the polarizing plate obtained in Example 4 was also surface modified in the same manner as in Example 1, and was laminated with the Zeonor film to obtain an optical device 1A.

Example 12

A xenon lamp made by Ushio U-Tech Inc. (UER200/HM172; energy of 7.3 eV) was used, a triacetyl cellulose (TAC) film made by Fuji Photo Film Co., Ltd. was used as the protective film a as shown in FIG. 4, and a Zeonor film made by Zeon Corporation was used as the retardation plate d, the distance between the xenon lamp and the two films was accurately adjusted to 2 mm, and irradiation with ultraviolet rays was performed in air for 200 seconds. Then, the TAC film and the Zeonor film were laminated on both sides of the polarizing film b as shown in Example 1 under a lamination pressure of 2.94 N/cm$^2$, and the adhesive strength thereof was measured by 90-degree peel test. As a result, the Zeonor film was broken at a width of 50 mm.

Comparative Example 1

A polarizing film and the protective film on one side thereof, which had not been surface modified, were laminated under a lamination pressure of 2.94 N/cm$^2$ under the same conditions as in Example 1, but the polarizing film and the protective film could not be integrated. The contact angle between water and the protective film that had not been surface modified was measured under the same conditions as in Example 1 and found to be 50°. This tells us that the polarizing film and the protective film can not be bonded together when the protective film is not surface modified.

The invention claimed is:

1. A method for manufacturing an optical device comprising a polarizing plate, wherein the polarizing plate comprises:
   a polyvinyl alcohol- or polyvinylene-base polarizing film; and
   a protective film laminated on at least one side of the polarizing film, wherein the protective film is composed of a triacetyl cellulose, a polycarbonate, a polyethylene terephthalate, a polyethylene naphthalate, a (meth)acrylate resin, an alicyclic polyolefin resin or an alicyclic acrylic resin,
   wherein said method comprises:
   treating at least one surface of the surfaces of the polarizing film and the protective film that are in contact with each other, with energy rays having an energy of at least 5 eV; and then
   directly laminating the polarizing film and the protective film on top of one another without any adhesive layer including a pressure sensitive adhesive layer interposed therebetween.

2. The method according to claim 1, wherein the energy rays are selected from the group consisting of ultraviolet rays, electron beams and ion beams.

3. The method according to claim 2, wherein the energy rays are ultraviolet rays from a ray source selected from the group consisting of an excimer laser, a high-pressure mercury lamp, a low-pressure mercury lamp, a halogen lamp and an excimer lamp.

4. The method according to claim 3, wherein at least one of the ray sources is an excimer lamp, and the excimer lamp is a dielectric barrier discharge lamp charged with argon, krypton or xenon, or a gas predominantly comprising argon, krypton or xenon.

5. The method according to claim 1, wherein at least one of the polarizing film surface and the protective film surface is in contact with at least one gas during energy ray irradiation, wherein the at least one gas is selected from the group consisting of air, hydrogen, oxygen, nitrogen, ozone, hydrogen peroxide, water vapor, carbon dioxide, carbon monoxide, ammonia, nitrogen monoxide, nitrogen dioxide, inert gases, low-boiling organic compounds and mixtures thereof.

6. The method according to claim 1, wherein the optical device is adapted for being mounted in a liquid crystal cell of a liquid crystal display device, wherein the optical device further comprises:
   a retardation plate composed of a material selected from the group consisting of a triacetyl cellulose, a polycarbonate, a polyvinyl alcohol, a polyvinyl butyral, a polyethylene terephthalate, a polypropylene, a polyallylate, a polysulfone, a polyether sulfone, a (meth)acrylate resin, an alicyclic polyolefin resin and an alicyclic acrylic resin,
   wherein said method further comprises:
   treating at least one surface of the surfaces of the retardation plate, the polarizing film and the protective film that are in contact with each other, with energy rays having an energy of at least 5 eV; and then
   directly laminating the retardation plate, without any adhesive layer including a pressure sensitive adhesive layer interposed therebetween, to the protective film on the liquid crystal cell side in a case where the protective film is laminated on both sides of the polarizing film, or to the polarizing film on the side where no protective film has been laminated in a case where the protective film is laminated on only one side of the polarizing film.

7. The method according to claim 6, wherein the energy rays are selected from the group consisting of ultraviolet rays, electron beams and ion beams.

8. The method according to claim 7, wherein the energy rays are ultraviolet rays from a ray source selected from the group consisting of an excimer laser, a high-pressure mercury lamp, a low-pressure mercury lamp, a halogen lamp and an excimer lamp.

9. The method according to claim 8, wherein at least one of the ray sources is an excimer lamp, and the excimer lamp is a dielectric barrier discharge lamp charged with argon, krypton or xenon, or a gas predominantly comprising argon, krypton or xenon.

10. The method according to claim 1, wherein the protective film surface on an observer's side is subjected to at least one of an antiglare treatment and an antireflective treatment.

11. The method according to claim 1, wherein said method further comprises, after said treating and before said laminating:
   immersing in water the polarizing film and the protective film that are in contact with each other.

* * * * *